(12) United States Patent
Kim

(10) Patent No.: US 7,245,816 B2
(45) Date of Patent: Jul. 17, 2007

(54) METHOD FOR DESIGNING ENVELOPE DETECTING CIRCUIT FOR VIDEO SIGNAL PROCESSING INTEGRATED CIRCUIT AND INTEGRATED CIRCUIT USING THE SAME

(75) Inventor: Chul-min Kim, Suwon (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1130 days.

(21) Appl. No.: 09/832,200

(22) Filed: Apr. 11, 2001

(65) Prior Publication Data

US 2002/0028059 A1   Mar. 7, 2002

(30) Foreign Application Priority Data

Sep. 5, 2000   (KR) .............................. 2000-52371

(51) Int. Cl.
*H04N 9/88* (2006.01)
(52) U.S. Cl. .............................. 386/2; 360/70; 360/71; 386/68; 386/33; 386/69
(58) Field of Classification Search ................. 360/72, 360/71, 69, 68, 108, 114; 386/68, 69, 71
See application file for complete search history.

(56) References Cited

U.S. PATENT DOCUMENTS

| | | | | |
|---|---|---|---|---|
| 4,809,332 A | * | 2/1989 | Jongman et al. | 704/231 |
| 5,107,381 A | * | 4/1992 | Mitsuhashi et al. | 360/70 |
| 5,218,489 A | * | 6/1993 | Jeong et al. | 360/70 |
| 5,359,428 A | * | 10/1994 | Kubota et al. | 386/33 |
| 5,519,549 A | * | 5/1996 | Choi | 360/71 |
| 5,540,907 A | * | 7/1996 | Blumel et al. | 423/610 |
| 5,541,780 A | * | 7/1996 | Han | 386/69 |
| 5,684,916 A | * | 11/1997 | Hong | 386/68 |
| 6,185,359 B1 | * | 2/2001 | Gedl et al. | 386/2 |
| 6,600,344 B1 | * | 7/2003 | Newman et al. | 327/58 |

OTHER PUBLICATIONS

The Radio Amateur's Handbook, By the Headquarters Staff of the American Radio Relay League, 1972 pp. 81-88.*

* cited by examiner

*Primary Examiner*—Tai Q. Tran
*Assistant Examiner*—Helen Shibru
(74) *Attorney, Agent, or Firm*—Robert E. Bushnell, Esq.

(57) ABSTRACT

In a method for designing an envelope detecting circuit for a video signal processing integrated circuit (IC), the number of peripheral components of the video signal processing IC is minimized by incorporating, into the video signal processing IC, a circuit device for detecting the envelope of an FM video signal and for controlling the envelope level. According to the IC designing method, the number of components can be reduced by designing all circuit elements constituting a circuit which detects the envelope of the FM video signal and which controls envelope level so that they are incorporated into the video signal processing IC at the time of designing the video signal processing IC. As a result, cost is reduced and, since mode control signal lines are reduced, the corresponding terminals of the microprocessor can be used for another purpose, thereby increasing the operating efficiency of the microprocessor.

20 Claims, 2 Drawing Sheets

METHOD FOR DESIGNING ENVELOPE DETECTING CIRCUIT FOR VIDEO SIGNAL PROCESSING INTEGRATED CIRCUIT AND INTEGRATED CIRCUIT USING THE SAME

CLAIM OF PRIORITY

This application makes reference to, incorporates the same herein, and claims all benefits accruing under 35 U.S.C. §119 from my application ENVELOPE DETECTING CIRCUIT DESIGN METHOD OF VIDEO SIGNAL PROCESSING IC AND IC USING THEREOF filed with the Korean Industrial Property Office on 5 Sep. 2000 and there duly assigned Ser. No. 52371/2000.

BACKGROUND OF THE INVENTION

1. Technical Field

The present invention relates to a video signal processing integrated circuit (IC) and an IC designing method and, more particularly, to a method for designing an envelope detecting circuit for a video signal processing IC in order to reduce operating steps and material costs by minimizing the number of components of external application circuits of the video signal processing IC, and to an IC using the method.

2. Related Art

In general, in order to execute auto tracking in a video cassette recorder (VCR), an envelope of a frequency modulated (FM) video signal is detected during a playback mode for input to a microprocessor, which is also called a μ-COM. Then, the microprocessor executes auto tracking control using the waveform level of the input envelope.

However, a problem arises in that the level of the input envelope differs according to the playback mode. That is, in the super long playback (SLP) mode, the width of a video track recorded on a video tape is relatively narrow, whereas in the standard playback (SP) mode, the width of the video track is relatively wider. Accordingly, the level of the detected FM video signal is relatively low in the SLP mode. Thus, in order to execute auto tracking accurately, irrespective of the playback mode, it is necessary to reduce the variation in the envelope level with the type of playback mode.

As a result of the above phenomenon, it is necessary to maintain the envelope level at the same level according to the playback mode, and this has only been possible up to this point by increasing the number of peripheral components of the video signal processing IC, resulting in a lowering of the manufacturing efficiency and an increase in material cost.

SUMMARY OF THE INVENTION

To solve the above problems, it is an object of the present invention to provide an envelope detecting circuit designing method for a video signal processing integrated circuit (IC) in order to minimize the number of peripheral components of the video signal processing IC by incorporating resistors and a level switching circuit of the envelope detector into the video signal processing IC, and to provide an IC using the method.

Accordingly, to achieve the above object, there is provided a method for designing a video signal processing integrated circuit (IC) having an envelope detector for detecting the envelope of an FM video signal. A level variation switching circuit, which functions in dependence on playback mode, has a resistor at the output terminal of an envelope detector of the video signal processing IC for changing the envelope level according to an execution mode. The latter circuit is incorporated into the video signal processing IC, and ON/OFF switching control of the level variation switching circuit is executed in response to a control data input from microprocessor.

According to another aspect of the present invention, there is provided a video signal processing integrated circuit (IC) which includes an envelope detecting circuit for detecting the envelope level of an FM video signal. The envelope detecting circuit includes a peak detector for receiving the FM video signal and for detecting the peak value of the FM video signal, and a level switch for receiving the output of the peak detector and for controlling the envelope level according to the SP/SLP mode information applied from a microprocessor in order to reduce any difference in the envelope level according to the SP/SLP mode.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, and wherein.

DESCRIPTION OF THE PREFERRED EMBODIMENT

The invention will now be described in more detail with reference to the various figures of the drawings.

Figure 1:
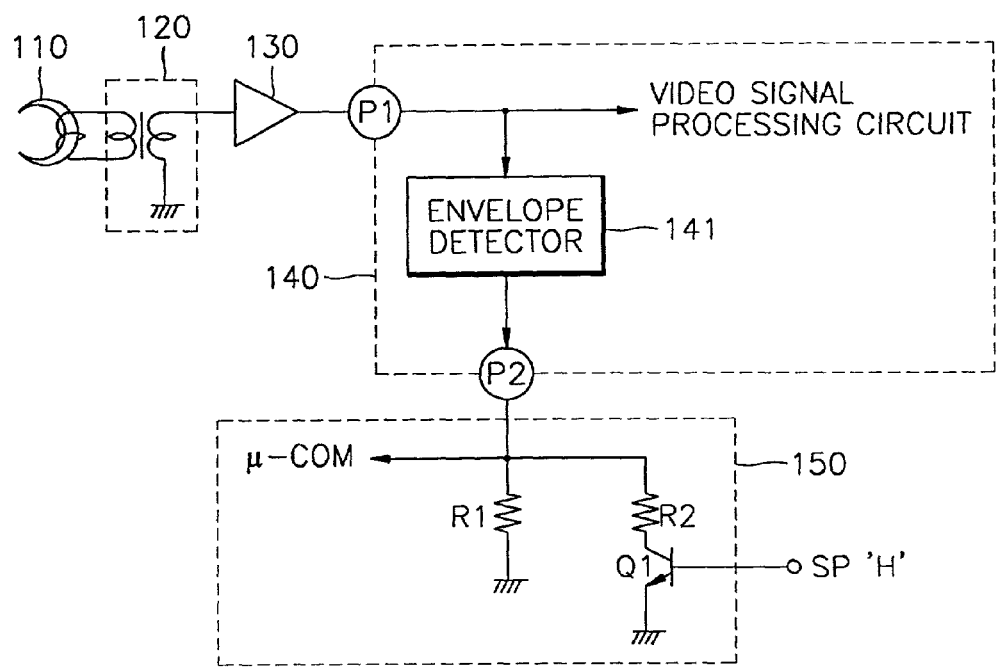
FIG. 1 is a schematic diagram illustrating a reproducing circuit of a video cassette recorder (VCR) having a video signal processing integrated circuit (IC)

FIG. 1 is a schematic diagram illustrating a reproducing circuit of a video cassette recorder (VCR) having a video signal processing integrated circuit (IC).

A reproducing circuit of a VCR including a conventional FM video signal envelope detector, as shown in FIG. 1, includes a video head 110, a rotary transformer 120, a pre-amplifier 130, an envelope detector 141 included in a video signal processing integrated circuit (IC) 140, and a level switch 150 having resistors R1 and R2 and a transistor Q1.

A frequency modulated (FM) video signal detected by the video head 110 during a playback mode is input to the pre-amplifier 130 via the rotary transformer 120, and is amplified with a predetermined gain by the pre-amplifier 130 for input to a pin P1 of the video signal processing IC 140.

The envelope waveform of the signal input to the pin P1 of the video signal processing IC 140 is extracted by the envelope detector 141 and is output to a pin P2. The envelope level of the FM video signal varies according to the playback mode. In other words, in the super long playback (SLP) mode, the width of a video track recorded on a video tape is relatively narrow compared to the width of the video track in the standard playback (SP) mode. Accordingly, the level of the FM video signal detected by the video head 110 is also relatively low during the SLP mode compared to the SP mode. Thus, in order to execute auto tracking accurately irrespective of the playback mode, it is necessary to reduce any variation of the envelope level with the type of playback mode.

Accordingly, the signal output to the pin P2 of the video signal processing IC 140 during the SP mode is reduced in its gain value by turning on the transistor Q1 to attenuate the envelope level, thereby adjusting the envelope level to that of the SLP mode.

Therefore, in order to maintain the envelope level at the same level regardless of the playback mode, it is necessary to provide the level switch 150, in the form of resistors R1, R2 and transistor Q1, external to the video signal processing IC 140. This increases the number of peripheral components of the video signal processing IC 140, resulting in a lowering of manufacturing efficiency and an increase in material cost.

Figure 2:
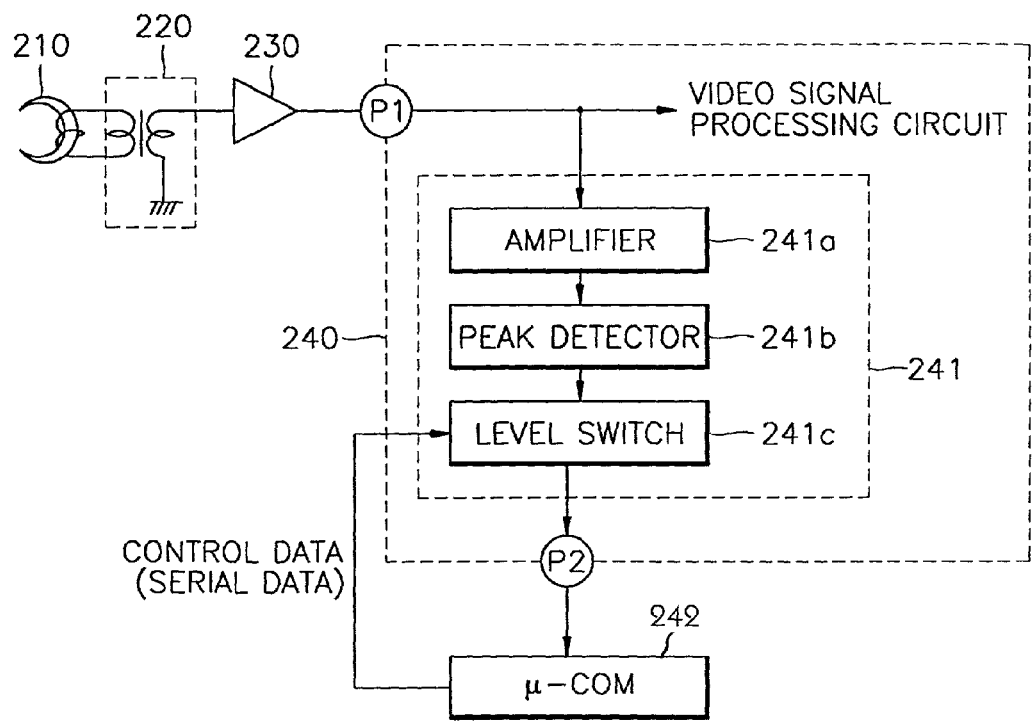
FIG. 2 is a schematic diagram illustrating a reproducing circuit of a video cassette recorder (VCR) having a video signal processing integrated circuit (IC) according to the present invention.

FIG. 2 is a schematic diagram illustrating a reproducing circuit of a video cassette recorder (VCR) having a video signal processing integrated circuit (IC) according to the present invention.

As shown in FIG. 2, a reproducing circuit of a VCR having a video signal processing IC according to the present invention includes a video head 210, a rotary transformer 220, a pre-amplifier 230, and a video signal processing IC 240 having an envelope detector 241.

In detail, the envelope detector 241 includes an amplifier 241a, a peak detector 241b and a level switch 241c.

Figure 3:
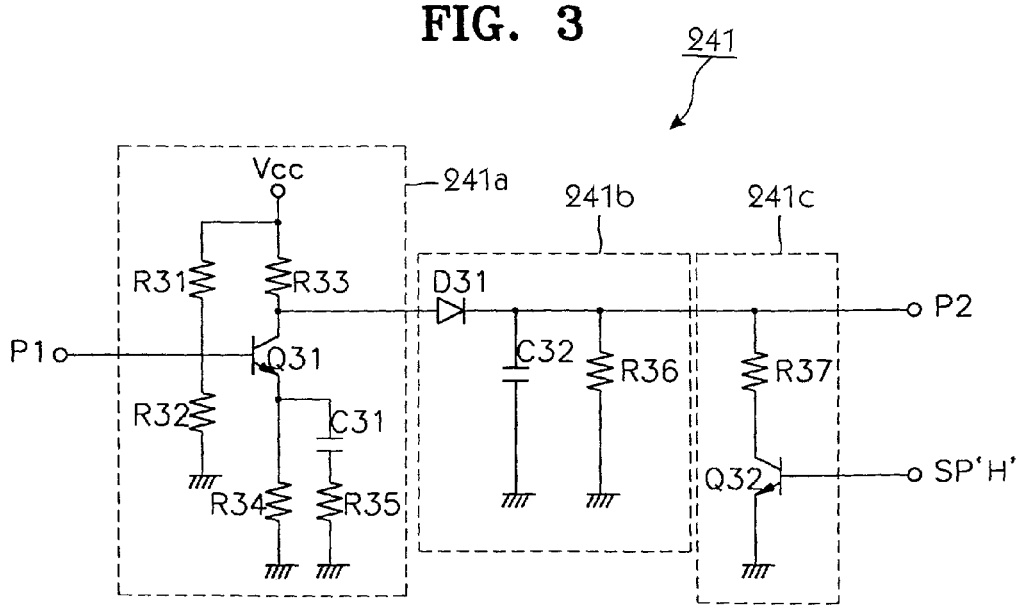
FIG. 3 is a detailed circuit diagram illustrating the envelope detecting circuit shown in FIG. 2.

The detailed circuitry of the respective circuit blocks constituting the envelope detecting circuit 241 of FIG. 2 is shown in FIG. 3, and will be discussed below.

First, the basic operation of a VCR will now be described. During playback mode, an FM video signal detected by a video head 210 is input to the pre-amplifier 230 via the rotary transformer 220, and is amplified in the pre-amplifier 230 with a predetermined gain for output to a pin P1 of the video signal processing IC 240.

Then, the video signal processing IC 240 executes general video signal processing, such as demodulation of a modulated video signal. Simultaneously, in order to output the envelope waveform of an FM video signal to the microprocessor (μ-COM) 242 for auto tracking control, the signal input to the pin P1 passes through the envelope detector 241. Accordingly, the microprocessor 242 controls a servo (not shown) at the time of converting an execution mode, thereby completing tracking adjustment at a state in which the level of the input envelope waveform reaches a maximum value.

The operation of the envelope detector 241, constituted by the amplifier 241a, the peak detector 241b and the level switch 241c, will now be described with reference to FIG. 3, which is a detailed circuit diagram illustrating the envelope detector 241 shown in FIG. 2.

The FM luminance signal input to the pin P1 of the video signal processing IC 240 is input to a base terminal of a transistor Q31 in the amplifier 241a, and is amplified with a gain G (approximately equal to R33/(R34//R35)) for output to a collector terminal of the transistor Q31. The amplified FM video signal output at the collector terminal of the transistor Q31 is input to the peak detector 241b, having a diode D31, a capacitor C32 and a resistor R36, wherein an envelope of the input signal is detected.

In the case where the playback mode is the SP mode, since the base terminal of transistor Q32 in the level switch 241c goes "high" in response to a control data input from the microprocessor 242, the transistor Q32 is turned on so that current flows through a resistor R37. Accordingly, the gain value of the amplifier 241a, as affected by the resistor R37, is reduced.

In the case where the playback mode is the SLP mode, since the base terminal of a transistor Q32 constituting the level switch 241c goes "low" in response to the control data input from the microprocessor 242, the transistor Q32 is turned off and current does not flow through the resistor R37. Accordingly, the gain value of the amplifier 241a is not affected by the resistor R37.

Based on the above-described principle, any variation in the envelope level of an FM video signal between the SP mode and the SLP mode can be reduced.

In the present invention, all circuit elements constituting the envelope detector 241, such as the amplifier 241a, the peak detector 241b and the level switch 241c, are incorporated into the video signal processing IC 240 at the time of design of the video signal processing IC 240, and the output terminal of the envelope detector 241 of the video signal processing IC 240 is designed so as to be directly connected to the input terminal of the microprocessor 242 without any component being added to the output terminal of the envelope detector 241.

In the embodiment of the present invention, the amplifier 241a is installed at the input stage of the peak detector 241b. There may be a case in which the amplifier 241a is installed at the output stage of the peak detector 241b. In the case where the gain of the pre-amplifier 230 is sufficiently large, the amplifier 241a may then be removed.

As described above, according to the present invention, the number of components can be reduced by designing all circuit elements constituting the envelope detector 241 so as to be incorporated into the video signal processing IC 240 at the time of design of the video signal processing IC 240, thereby reducing the manufacturing processing cost. Also, since a savings in mode control signal lines is achieved, the corresponding terminal of the microprocessor 242 can be used for another purpose, thereby increasing the operating efficiency of the microprocessor.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A method of designing a video signal processing integrated circuit (IC), comprising the steps of:
   providing the video signal processing IC with an envelope detector for detecting and outputting an envelope of a frequency modulated (FM) video signal;
   providing the video signal processing IC with a level variation switching circuit for selectively changing an envelope level of the FM video signal; and
   connecting an input of the level variation switching circuit to a control output of a microprocessor so that ON/OFF switching control of the level variation switching circuit is executed in response to a control data input from the microprocessor so as to selectively control operation of the level variation switching circuit and changing of the envelope level of the FM video signal.

2. The method according to claim 1, wherein the level variation switching circuit reduces variation in the envelope level of the FM video signal according to standard playback (SP) mode information and super long playback (SLP) mode information, respectively, contained in the control data input from the microprocessor.

3. The method according to claim 1, wherein the level variation switching circuit operates in dependence on a playback mode of a video cassette recorder.

4. The method according to claim 1, wherein the level variation switching circuit has a resistor at an output terminal of the envelope detector.

5. A video signal processing integrated circuit (IC) incorporating an envelope detecting circuit for detecting an envelope level of an FM video signal, wherein the envelope detecting circuit comprises:
   a peak detector for receiving the FM video signal and for detecting a peak value of the FM video signal; and
   a level switch having a first input connected to an output of the peak detector and having a second input connected to a control output of a microprocessor for selectively controlling the envelope level of the FM video signal according to mode information applied from the microprocessor so as to selectively reduce a variation in the envelope level in accordance with a type of mode of operation of a video cassette recorder (VCR).

6. The video signal processing IC according to claim 5, further comprising an amplifier connected to an input terminal of the peak detector for amplifying the FM video signal with a predetermined gain prior to provision to the peak detector.

7. The video signal processing IC according to claim 5, further comprising an amplifier connected to an output terminal of the peak detector for amplifying the FM video signal with a predetermined gain after processing in the peak detector.

8. A video signal processing integrated circuit (IC) incorporating an envelope detecting circuit for detecting an envelope level of an FM video signal, wherein the envelope detecting circuit comprises:
   a peak detector for receiving the FM video signal and for detecting a peak value of the FM video signal; and
   a level switch connected to an output of the peak detector for selectively controlling the envelope level of the FM video signal according to mode information applied from a microprocessor so as to reduce a variation in the envelope level in accordance with a type of mode of operation of a video cassette recorder (VCR);
   wherein the level switch includes a resistance element having a first terminal connected to the output of the peak detector and having a second terminal, and a switching control element connected to the second terminal of the resistance element, the switching control element being controlled by the mode information from the microprocessor.

9. The video signal processing IC according to claim 8, wherein the mode information comprises SP/SLP mode information relating to operation of the VCR.

10. The video signal processing IC according to claim 5, wherein the mode information comprises SP/SLP mode information relating to operation of the VCR.

11. A method of designing a video signal processing integrated circuit (IC) having an envelope detector for detecting an envelope of a frequency modulated (FM) video signal, said method comprising the steps of:
   providing a level variation switching circuit in the video signal processing IC for changing an envelope level of the FM video signal according to an execution mode;
   connecting an input of the level variation switching circuit to a control output of a microprocessor; and
   selectively providing an ON/OFF switching control of the level variation switching circuit in response to a control data input from the microprocessor, said control data input containing playback mode information relative to the FM video signal, so as to selectively change the envelope level of the FM video signal.

12. The method according to claim 11, further comprising the step of providing the level variation switching circuit with a capability of reducing variation in the envelope level of the FM video signal according to standard playback (SP) mode information and super long playback (SLP) mode information, respectively, contained in the control data input from the microprocessor.

13. The method according to claim 11, wherein the level variation switching circuit operates in dependence on a playback mode of a video cassette recorder.

14. The method according to claim 11, wherein the level variation switching circuit has a resistor at an output terminal of the envelope detector.

15. A video signal processing circuit for detecting an envelope level of an FM video signal input thereto, said circuit comprising:
   peak detector means for receiving the FM video signal and for detecting a peak value of the FM video signal; and
   level switch means connected to said peak detector means for selectively controlling the envelope level of the FM video signal according to playback mode information relating to a mode of operation of a video cassette recorder (VCR), said playback mode information being applied to said level switch means so as to selectively reduce a variation in the envelope level in accordance with the mode of operation of the video cassette recorder (VCR).

16. The video signal processing circuit according to claim 15, further comprising an amplifier connected to an input terminal of said peak detector means for amplifying the FM video signal with a predetermined gain prior to provision to said peak detector means.

17. The video signal processing circuit according to claim 15, further comprising an amplifier connected to an output terminal of said peak detector means for amplifying the FM video signal with a predetermined gain after processing in said peak detector means.

18. A video signal processing circuit for detecting an envelope level of an FM video signal input thereto, said circuit comprising:
   peak detector means for receiving the FM video signal and for detecting a peak value of the FM video signal; and
   level switch means connected to said peak detector means for selectively controlling the envelope level of the FM video signal according to mode information applied thereto so as to selectively reduce a variation in the envelope level in accordance with a mode of operation of a video cassette recorder (VCR);
   wherein said level switch means includes a resistance element having a first terminal connected to said peak detector means and having a second terminal, said level switch means further including a switching control element connected to the second terminal of the resistance element, the switching control element being controlled by the mode information applied to said level switch means.

19. The video signal processing circuit according to claim 18, wherein the mode information comprises SP/SLP mode information relating to operation of the VCR.

20. The video signal processing circuit according to claim 15, wherein the mode information comprises SP/SLP mode information relating to operation of the VCR.

* * * * *